US010048847B2

(12) United States Patent
Kuscher et al.

(10) Patent No.: US 10,048,847 B2
(45) Date of Patent: *Aug. 14, 2018

(54) INTELLIGENT WINDOW SIZING AND CONTROL

(71) Applicant: Google Inc., Mountain View, CA (US)

(72) Inventors: Alexander Friedrich Kuscher, San Francisco, CA (US); John Nicholas Jitkoff, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 385 days.

This patent is subject to a terminal disclaimer.

(21) Appl. No.: 14/885,880

(22) Filed: Oct. 16, 2015

(65) Prior Publication Data

US 2016/0041744 A1 Feb. 11, 2016

Related U.S. Application Data

(63) Continuation of application No. 13/753,316, filed on Jan. 29, 2013, now Pat. No. 9,195,382.

(51) Int. Cl.
*G06F 3/0481* (2013.01)
*G06F 3/0484* (2013.01)
(Continued)

(52) U.S. Cl.
CPC ........ *G06F 3/04847* (2013.01); *G06F 3/0481* (2013.01); *G06F 3/04817* (2013.01);
(Continued)

(58) Field of Classification Search
CPC .. G06F 9/4443; G06F 3/0481; G06F 3/04847; G06F 2230/04806; G06F 2203/04806; G06F 9/451
See application file for complete search history.

(56) References Cited

U.S. PATENT DOCUMENTS

| 4,868,549 A | 9/1989 | Affinito et al. |
| 5,838,317 A | 11/1998 | Bolnick et al. |

(Continued)

FOREIGN PATENT DOCUMENTS

| JP | H 10-083272 A | 3/1998 |
| JP | H 11-327733 A | 11/1999 |

(Continued)

*Primary Examiner* — Eric J Bycer
(74) *Attorney, Agent, or Firm* — McDermott Will & Emery LLP

(57) ABSTRACT

The disclosed subject matter relates to a method for managing display of a window. In certain aspects, the method includes presenting a window in a display area, wherein the window comprises a control icon, receiving a first input indicating a selection of the control icon and presenting a plurality of selectable options associated with the control icon, wherein each of the plurality of selectable options correspond with one of a left direction or a right direction. In certain aspects, the method further includes receiving a second input indicating a selection of a first one of the plurality of selectable options and adjusting a size of the window in response to the second input based on a direction associated with the first one of the plurality of selectable options. Systems and computer-readable media are also provided.

20 Claims, 6 Drawing Sheets

(51) Int. Cl.
*G06F 9/451* (2018.01)
*G06F 9/44* (2018.01)

(52) U.S. Cl.
CPC ........ *G06F 3/04845* (2013.01); *G06F 9/4443* (2013.01); *G06F 9/451* (2018.02); *G06F 2203/04806* (2013.01)

(56) References Cited

U.S. PATENT DOCUMENTS

| | | |
|---|---|---|
| 5,883,625 A | 3/1999 | Crawford et al. |
| 5,943,053 A | 8/1999 | Ludolph et al. |
| 2002/0054133 A1 | 5/2002 | Jameson |
| 2002/0089546 A1 | 7/2002 | Kanevsky et al. |
| 2003/0208491 A1 | 11/2003 | Pasquail |
| 2005/0068290 A1 | 3/2005 | Jaeger |
| 2006/0001650 A1 | 1/2006 | Robbins et al. |
| 2007/0016875 A1 | 1/2007 | Santos-Gomez |
| 2007/0162868 A1 | 7/2007 | Vignet |
| 2007/0229556 A1 | 10/2007 | Kim et al. |
| 2007/0245269 A1 | 10/2007 | Kim et al. |
| 2008/0016461 A1 | 1/2008 | Hoblit |
| 2008/0184160 A1 | 7/2008 | Chang et al. |
| 2008/0266066 A1 | 10/2008 | Braun et al. |
| 2009/0164936 A1 | 6/2009 | Kawaguchi |
| 2010/0023857 A1 | 1/2010 | Mahesh et al. |
| 2010/0107118 A1* | 4/2010 | Pearce ................. G06F 3/0481 715/799 |
| 2011/0018697 A1 | 1/2011 | Birnbaum |
| 2011/0191713 A1 | 8/2011 | Numazaki |
| 2011/0285667 A1 | 11/2011 | Poupyrev et al. |
| 2011/0302528 A1 | 12/2011 | Starr |
| 2012/0151409 A1* | 6/2012 | Matsuda ............. G06F 3/04886 715/800 |
| 2012/0244913 A1 | 9/2012 | Dobroth et al. |
| 2013/0176261 A1* | 7/2013 | Kajiyama ............. G06F 3/0488 345/173 |

FOREIGN PATENT DOCUMENTS

| | | |
|---|---|---|
| JP | 2006-179006 A | 7/2006 |
| JP | 2006-189989 A | 7/2006 |
| JP | 2007-293849 A | 11/2007 |
| JP | 2008-027196 A | 2/2008 |
| JP | 2010-525380 A | 7/2010 |
| JP | 2011-159082 A | 8/2011 |
| JP | 2012-504267 A | 2/2012 |
| JP | 2012-128562 A | 7/2012 |
| KR | 1020070097889 A | 10/2007 |
| WO | WO 2010035162 A2 * | 4/2010 ............. G06F 3/048 |
| WO | WO-2012/039288 A1 | 3/2012 |

* cited by examiner

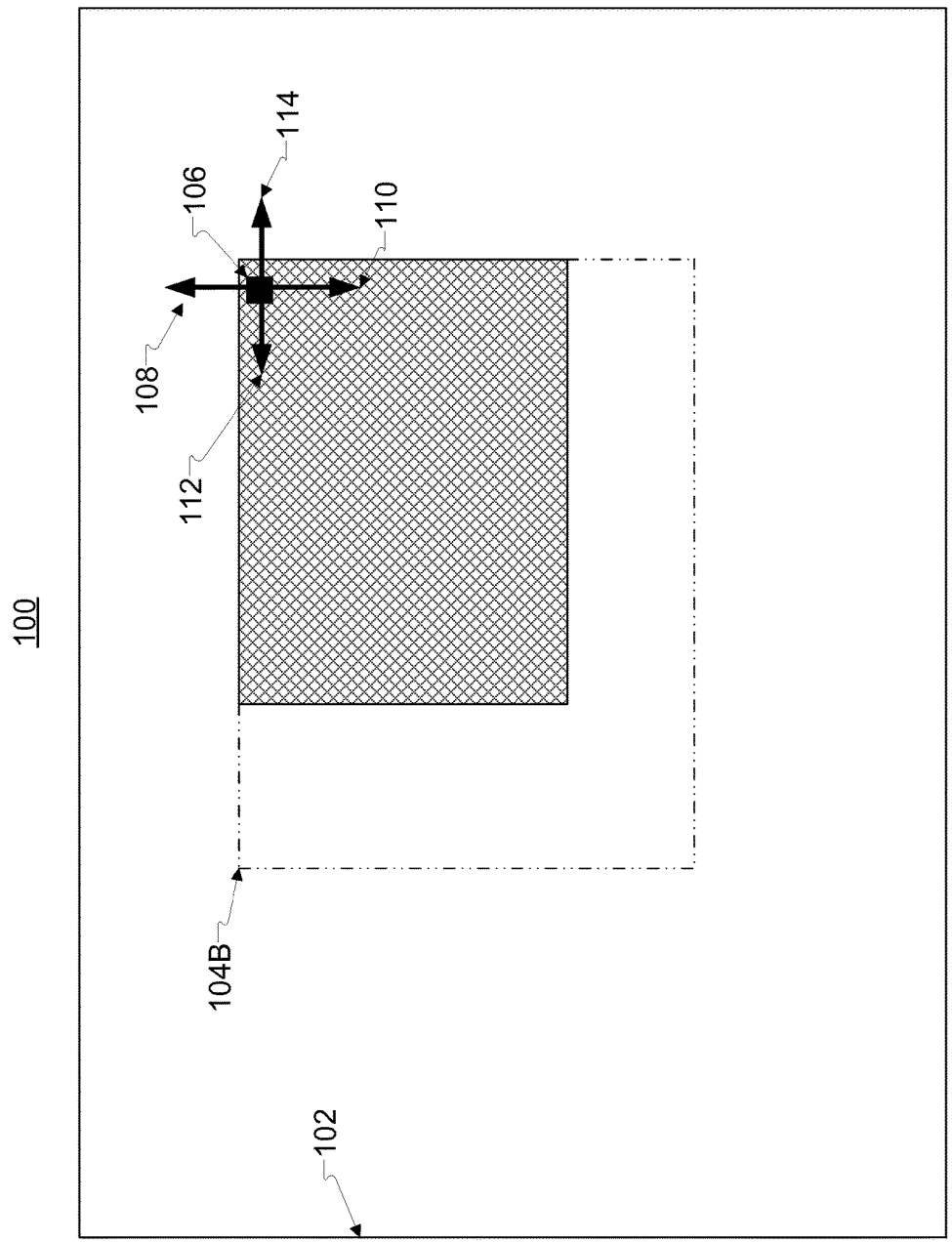

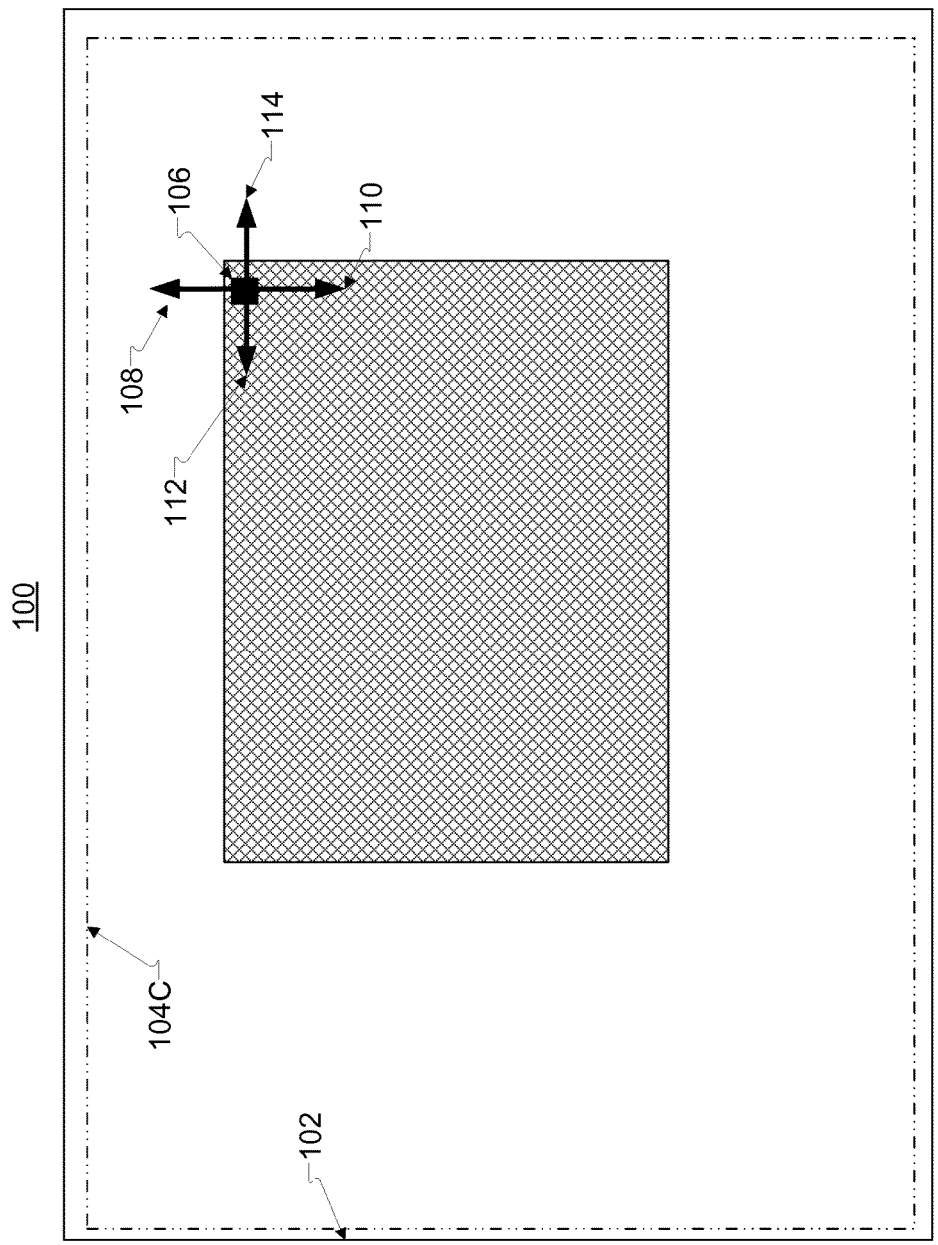

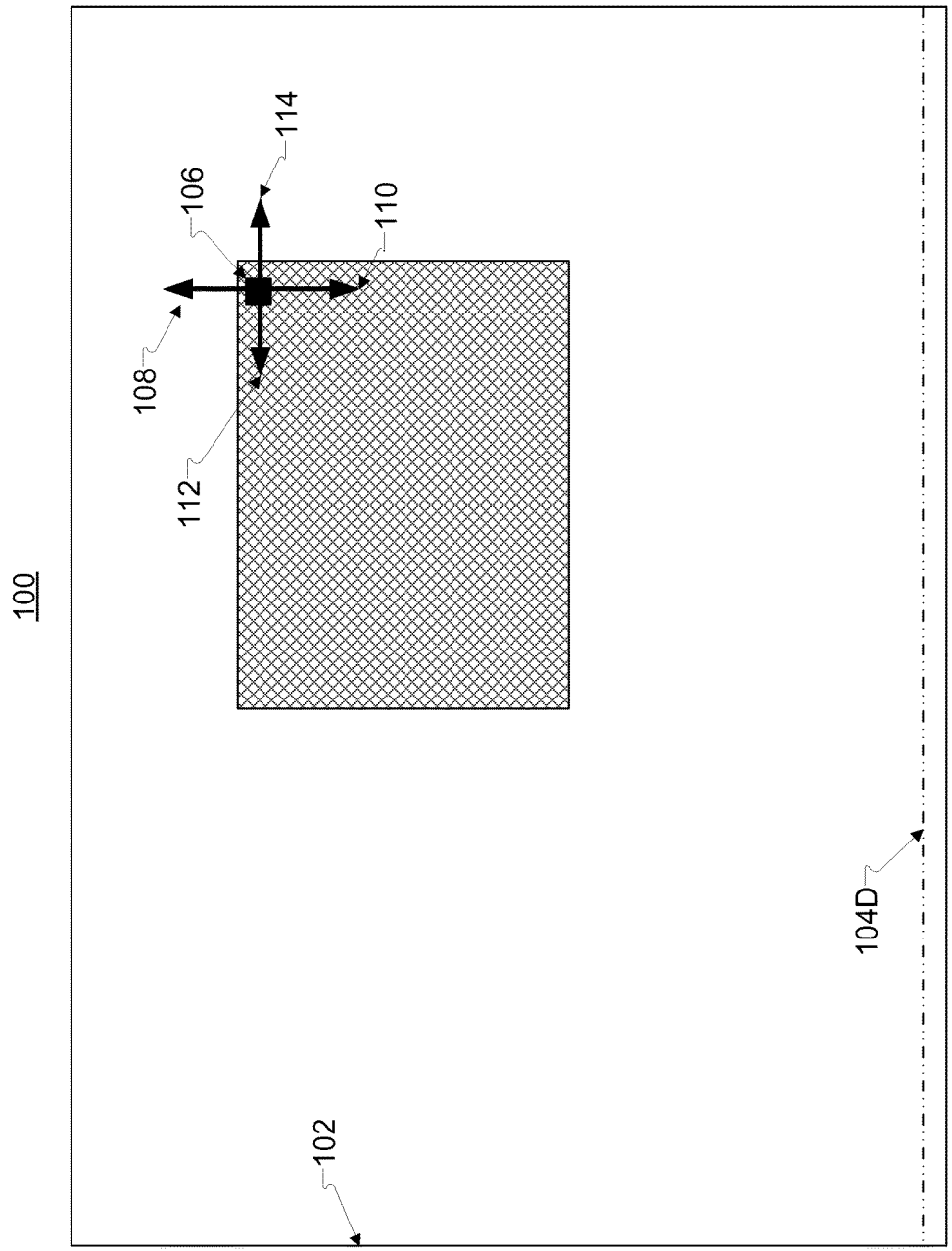

INTELLIGENT WINDOW SIZING AND CONTROL

CROSS-REFERENCE TO RELATED APPLICATIONS

This application is a continuation of U.S. patent application Ser. No. 13/753,316, titled "INTELLIGENT WINDOW SIZING AND CONTROL" and filed on Jan. 29, 2013, which is incorporated in its entirety herein by reference.

BACKGROUND

The subject technology relates to a user interface and method for managing windows, and particularly, to a window manager for running and managing the display of one or more windows.

SUMMARY

The disclosed subject matter relates to a method for managing display of a window. In certain aspects, the method includes presenting a window in a display area, wherein the window comprises a control icon, receiving a first input indicating a selection of the control icon and presenting, in response to the first input, a plurality of selectable options associated with the control icon, wherein each of first and second selectable options correspond with an option icon positioned immediately adjacent the control icon. In certain aspects, the method further includes receiving a second input indicating a selection of one of the first and second selectable options, and adjusting a size of the window in response to the second input, wherein adjusting the size of the window comprises changing a size of two or more edges of the window based on a direction associated with the selected selectable option.

In another aspect, the subject technology relates to a system for managing display of a window. In some implementations, the system includes one or more processors, a display coupled to the one or more processors and a computer-readable medium coupled to the one or more processors, wherein the computer-readable medium includes instructions stored therein, which when executed by the one or more processors, cause the processors to perform operations including presenting, in response to the first input, a plurality of selectable options associated with the control icon, wherein each of first and second selectable options correspond with one of a left direction and a right direction, wherein each of the first and second selectable options correspond with an option icon positioned immediately adjacent the control icon. In certain implementations, receiving a second input, from the user, indicating a selection of one of the first and second selectable options and adjusting a size of the window in response to the second input, wherein adjusting the size of the window comprises changing a size of two or more edges of the window based on a direction associated with the selected selectable option.

In yet another aspect, the disclosed subject matter relates to a computer-readable medium including instructions stored therein, which when executed by one or more processors, cause the processors to perform operations including presenting a window in a display area, wherein the window includes a control icon, receiving a first input, from a user, indicating a selection of the control icon and presenting, in response to the first input, a plurality of selectable options associated with the control icon, wherein two of the plurality of selectable options correspond with one of a left direction and a right direction and further correspond with an option icon positioned immediately adjacent leftward and rightward of the control icon, respectively. In some implementations, the processors may further perform operations for receiving a second input, from the user, indicating a selection of a first one of the two of the plurality of selectable options and adjusting a size of the window in response to the second input, wherein adjusting the size of the window comprises changing a size of two or more edges of the window based on a direction associated with the first one of the plurality of selectable options.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the disclosed aspects. In the drawings:

FIG. 1B illustrates an example GUI, including a window control icon that can be used to implement certain aspects of the disclosure.

FIG. 1C illustrates an example GUI, including a window control icon that can be used to implement certain aspects of the disclosure.

FIG. 1D illustrates an example GUI, including a window control icon that can be used to implement certain aspects of the disclosure.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Aspects of the subject disclosure provide system software and methods for presenting and controlling the appearance of one or more windows in a graphical user interface. In certain aspects, methods of the subject disclosure can be used to affect the sizing and placement of one or more windows, for example, within a display area in a graphical user interface (GUI).

In certain aspects, the subject technology provides a window manager that can be configured to display a "window control" icon, for example, in one or more windows displayed in a display area of a GUI. Although the window control icon can be positioned anywhere on (or within) the display area, in some implementations it will be located next to a "close window" icon displayed within a window presented in the display area. Selection of the window control icon (e.g., by a user) will cause the presentation of selectable options that can be used to resize the corresponding window. In certain aspects, the selectable options are displayed as icons, for example, arrow icons pointing in different directions of the display (e.g., an up-arrow, a down-arrow, a left-arrow and a right-arrow). By selecting one of the selectable options, the user can adjust sizing of the associated window.

User selection of the selectable options can vary with implementation. For example, selection can be performed using a cursor or touch based input. In some implementations, a user gesture (e.g., a gesture made with a cursor or a pointing device) can be interpreted by the window manager for use in selecting one of the selectable options. By way of example, after selecting the window control icon, a user may move the cursor in an upward direction indicating selection of a corresponding selectable option. As a result, the display of the associated window can be maximized.

Figure 1A:
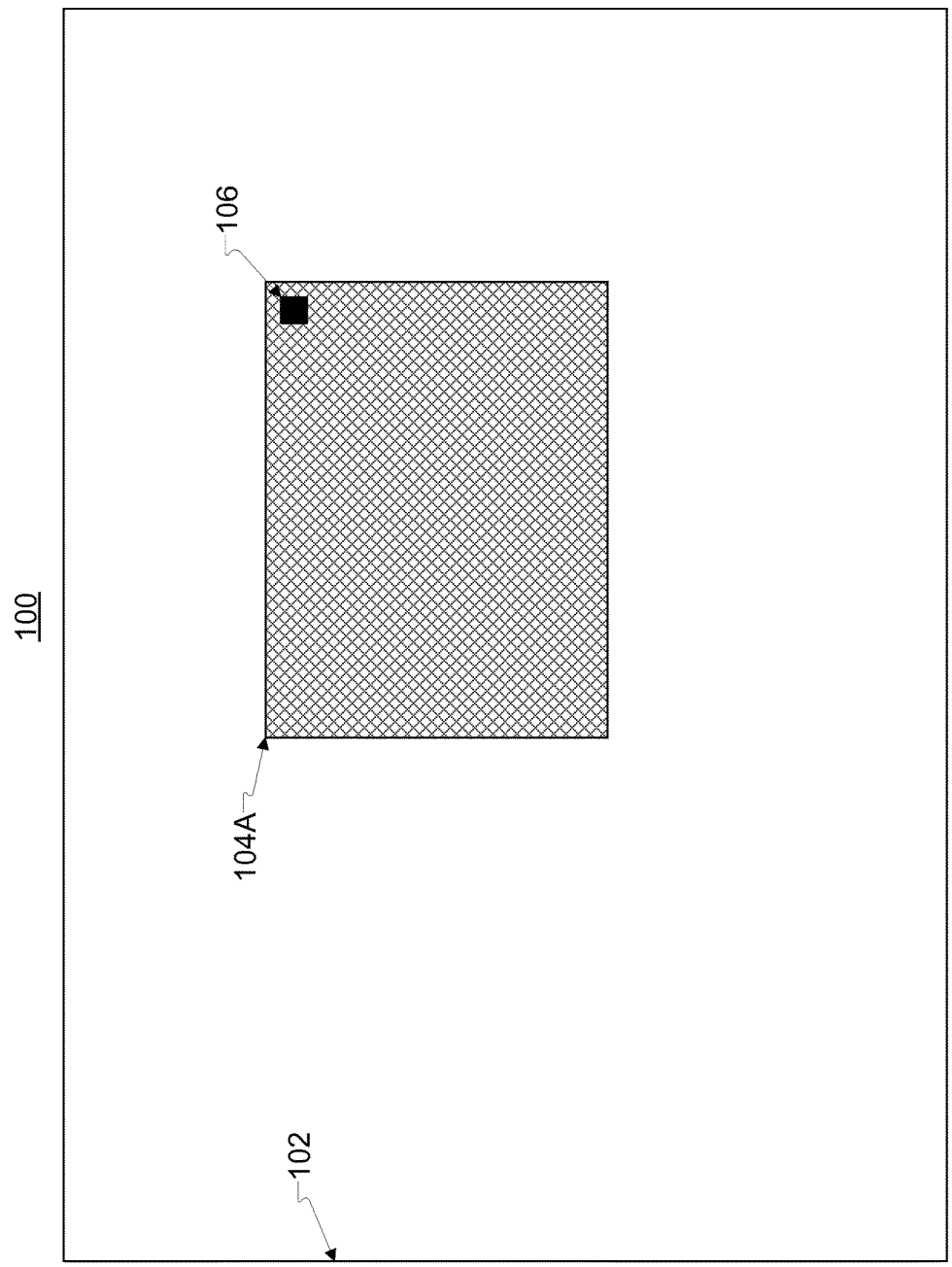
FIG. 1A illustrates an example of a graphical user interface (GUI), including a window control icon that can be used to implement certain aspects of the subject disclosure.

Although several of the examples illustrated herein involve a single window having a single control icon, multiple windows can be simultaneously presented within the display area of a GUI. FIG. 1A illustrates an example of a GUI, comprising a window control icon (hereinafter "control icon"). Specifically, GUI 100 includes display area 102, window 104A and control icon 106. As discussed above, window 104A can be sized/resized based on input received, for example, with respect to control icon 106.

In certain implementations, selection of control icon 106 will cause a plurality of selectable options to be presented to the user. Depending on implementation, the selectable options may be visibly displayed to the user (e.g., on a display device). However, in some implementations, the selectable options may be available to the user (e.g., via a gesture), without being visibly displayed.

User selection of control icon 106 can cause the display of selectable options as illustrated in FIG. 1B. Specifically, FIG. 1B illustrates display area 102 having window 104B, control icon 106 and a plurality of selectable options (e.g., 108, 110, 112 and 114). The selectable options (e.g., 108, 110, 112 and 114) are presented in response to selection of control icon 106. In the example of FIG. 1B the selectable options (e.g., 108, 110, 112 and 114) are illustrated as icons associated with a particular direction. However, as mentioned above, the selectable options (e.g., 108, 110, 112 and 114) may not be visibly displayed to the user, but rather selectable via a particular gesture or input sequence, as will be described in further detail below.

After the selectable options have been presented (e.g., made available for selection), subsequent selection of one of the selectable options (e.g., 108, 110, 112 and 114) can cause window 104B to be resized, minimized or maximized.

As illustrated by the dotted line shown in FIG. 1B, the border of window 104B has been increased in size from that of window 104A. By way of example, selection of selectable option 112 could cause window 104A to be resized in the direction associated with selectable option 112 (e.g., along a left border as indicated by the dotted line). Similarly, window 104B could have been increased in size via user selection of selectable option 114, for example, in a right direction with respect to display area 102.

In other aspects, selection of the selectable options (e.g., 108, 110, 112 and 114) can cause the window 104B to be either maximized or minimized in the display area 102. An example wherein selectable option 108 is used to maximize the size of window 104B is illustrated in FIG. 1C. Specifically, FIG. 1C illustrates display area 102 used to display window 104C (e.g., the expanded version of window 104B, as shown in FIG. 1B). Upon indication of a user selection of selectable option 108, window 104C is maximized, as indicated by the dotted line illustrating the new boundary of window 104C.

In yet another aspect, selection of selectable options (e.g., 108, 110, 112 and 114) can cause a window to be minimized. For example, selection of selectable option 110 can cause window 104C to be minimized, as shown in the example of FIG. 1D. Specifically, FIG. 1D illustrates display area 102 in which window 104D has been minimized (e.g., window 104D represents the minimized version of window 104C, discussed above).

Figure 2:
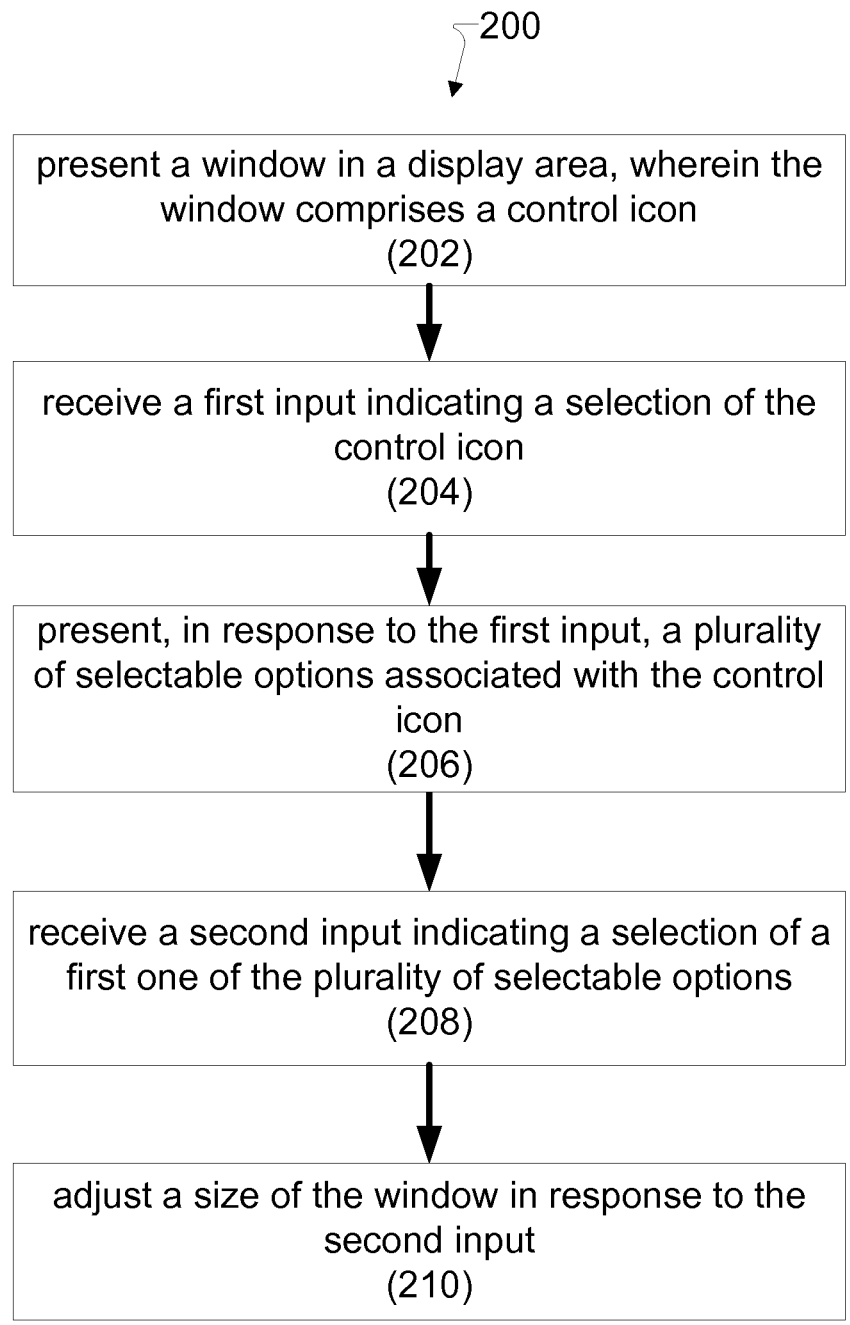
FIG. 2 illustrates steps of an example method for adjusting the size of one or more windows, according to certain aspects of the disclosure.

FIG. 2 illustrates steps of an example method 200 for adjusting the size of one or more windows. The method 200 begins with step 202 in which a window is presented in a display area and wherein the window comprises a control icon. As discussed above, the control icon (e.g., control icon 106) may be placed anywhere on (or in) the window (e.g., window 104A). In other aspects, the control icon may be placed in a location of the display area (e.g., display area 102) that is separate from the window.

In step 204, a first input is received that indicates selection of the control icon. By way of example, the first input could be received from a user via a selection means such as a pointer or a touch-based display; however, the reception of user input can be accomplished using a variety of means, including, but not limited to, gestures and/or voice commands, etc.

After the first input has been received, the method 200 proceeds to step 206 in which a plurality of selectable options associated with the control icon are presented. As discussed above, the selectable options can be visibly presented in the display area (e.g., using a graphical indication such as icons), or the selectable options can simply be made accessible via a gesture or other input received from a user.

In step 208, a second input is received indicating a selection of a first one of the plurality of selectable options. In response to the second input, method 200 proceeds to step 210 in which a size of the window in the display area is adjusted based on a direction associated with the first one of the plurality of selectable options.

Further to the above examples, if the second input indicates that the user has selected a selectable option associated with the left direction (e.g., with respect to the display area), the window can be increased in size by expanding the area of the window in a left direction, as shown in FIG. 1B. Similarly, if the second input indicates selection of a selectable option associated with a right direction, the window can be increased by expanding the area of the window in a right direction. Depending on implementation, resizing of a window (e.g., expansion or contraction of a display area of the window) can be performed in different ways. For example, the window may be expanded in a leftward direction (relative to the window placement in the display area) by increasing a length of two or more edges of the window (e.g., a top edge and a bottom edge), without regard to the window's original aspect ratio. Furthermore, resizing of a window may be performed such that the window's original aspect ratio is maintained, or such that an optimal aspect ratio is achieved after the resizing has been performed. By way of further example, all edges of a window may be resized to increase the window's display area along a specific direction (e.g., corresponding with a direction associated with the second input), while adjusting the aspect ratio based on content being displayed within the window.

Additionally, the window can be either maximized or minimized, as illustrated above with respect to FIGS. 1C and 1D, respectively. For example, if the second input indicates that the user has selected a selectable option associated with the downward direct, the window can be minimized. Alternatively, if the second input indicates that the user has selected a selectable option associated with the upward direction, the window can be maximized.

In certain implementations, sizing (or resizing) of a window will occur based on the placement of a grid (not shown) within the display area. The grid can be used for facilitating adjustments to one or more displayed windows e.g., window size, placement and/or behavior. Windows that are moved or resized by the user can be matched up with discrete contours of the grid. For example, the edges of a resized window can be aligned with grid contours that may (or may not) be visible to the user. Depending on the size and spacing of the grid contours, a user may have a greater number, or a fewer number, of resizing options. In some implementations, when the user moves (or resizes) a window, the edges of the window are snapped to the closest corresponding grid location.

In some implementations, a window can be snapped to an optimal grid position. A determination that the window should be snapped to a particular location on the grid (e.g., to a particular grid contour) can take into consideration several factors. For example, optimal window size/location may be determined based on total screen size, a number of windows that are displayed, window dimensions, window launch order, etc.

In other implementations, resistance can be provided to a window at certain grid locations (e.g., the window may "stick" to the grid at certain locations), depending on various conditions. By way of example, a window may stick to the grid at a location corresponding to the edge of the screen, for example, to prevent the content area of the window from being placed off-screen. Similarly, a window may stick to a grid location determined to be in a correct or optimal location, such as a grid location aligning with the edge of one or more other windows (e.g., to prevent overlap among windows), or a grid location located in an empty space (e.g., to guide the moving window into an open area away from other windows).

In certain aspects, movement of one or more edges of a window (e.g., the window 104A) over certain areas of a grid may require varying amounts of resistance. For example, a user may be required to provide additional (stronger) indications that he/she wishes to move the edges of the window across predetermined locations on the grid.

Figure 3:
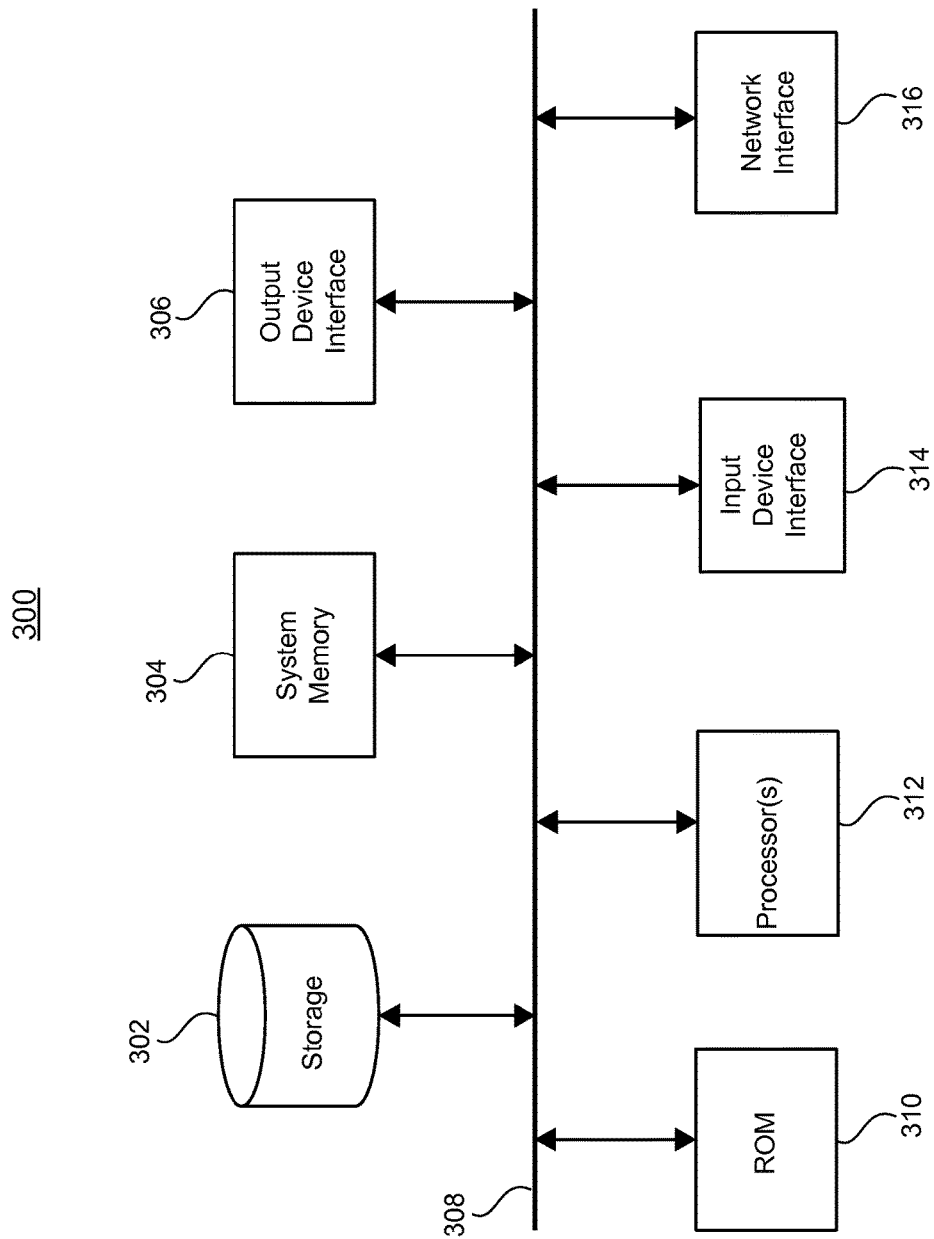
FIG. 3 illustrates an example of an electronic system, that can be used to implement some aspects of the of subject disclosure.

FIG. 3 illustrates an example of an electronic system that can be used for executing the steps of the subject disclosure. In some examples, the electronic system 300 can be a single computing device such as a server. Furthermore, in some implementations, the electronic system 300 can be operated alone or together with one or more other electronic systems e.g., as part of a cluster or a network of computers.

As illustrated, electronic system 300 includes storage device 302, system memory 304, output device interface 306, bus 308, ROM 310, one or more processor(s) 312, input device interface 314 and network interface 316. In some aspects, bus 308 collectively represents all system, peripheral, and chipset buses that communicatively connect the numerous internal devices of electronic system 300. For instance, bus 308 communicatively connects the processor(s) 312 with ROM 310, system memory 304, output device interface 306 and storage device 302.

In some implementations, the various memory units, processor(s) 312 retrieve instructions to execute (and data to process) in order to execute the steps of the subject technology. Processor(s) 312 can be a single processor or a multi-core processor in different implementations. Additionally, processor(s) 312 can include one or more graphics processing units (GPUs) and/or one or more decoders, depending on implementation.

ROM 310 stores static data and instructions that are needed by processor(s) 312 and other modules of electronic system 300. Similarly, processor(s) 312 can include one or more memory locations such as a CPU cache or processor in memory (PIM), etc. Storage device 302, is a read-and-write memory device. In some aspects, storage device 302 can be a non-volatile memory unit that stores instructions and data even when electronic system 300 is without power. Some implementations of the subject disclosure can use a mass-storage device (such as solid state, magnetic or optical storage devices) e.g., storage device 302.

Other implementations can use one or more a removable storage devices (e.g., magnetic or solid state drives) such as storage device 302. Although the system memory can be either volatile or non-volatile, in some examples, system memory 304 is a volatile read-and-write memory, such as a random access memory. System memory 304 can store some of the instructions and data that the processor needs at runtime.

In some implementations, the processes of the subject disclosure are stored in system memory 304, storage device 302, ROM 310 and/or one or more memory locations embedded with processor(s) 312. From these various memory units, processor(s) 312 retrieve instructions to execute and data to process in order to execute the processes/methods of some implementations of the instant disclosure.

In certain aspects, bus 308 also connects to input device interface 314 and output device interface 306. Input device interface 314 can enables a user to communicate information and select commands to electronic system 300. Input devices used with input device interface 314 may include for example, alphanumeric keyboards and pointing devices (also called "cursor control devices") and/or wireless devices such as wireless keyboards, wireless pointing devices, etc.

Finally, as shown in FIG. 3, bus 308 also communicatively couples electronic system 300 to a network (not shown) through network interface 316. It should be understood that network interface 316 can be either wired, optical or wireless and may comprise one or more antennas and transceivers. In this manner, electronic system 300 can be a part of a network of computers, such as a local area network ("LAN"), a wide area network ("WAN"), or a network of networks, such as the Internet.

The methods of the subject technology can be carried out by electronic system 300. In some aspects, instructions for performing one or more of the method steps of the present disclosure are stored on one or more memory devices such as storage device 302 and/or system memory 304. For example, electronic system 300 may be used to store and/or execute instructions to provide a graphical user interface (GUI) to a user of electronic system 300. In some implementations, behavior of the GUI will be controlled by software comprising a window manager, wherein the window manager is configured to present a window in a display area, and wherein the window comprises a control icon. The window manager can be further configured to receive a first input indicating a user's selection of the control icon and to present, in response to the first input, a plurality of selectable options associated with the control icon. In certain aspects, the window manager can be further configured to receive a second input indicating a selection of a first one of the plurality of selectable options and to adjust a size of the window in the display area based on a direction associated with the first one of the plurality of selectable options.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method for managing display of a window, the method comprising:
presenting a window in a display area, wherein the window comprises a control icon;
receiving a first input indicating a selection of the control icon;
presenting, in response to the first input, a plurality of selectable options associated with the control icon, wherein each of first and second selectable options correspond with an option icon positioned immediately adjacent to the control icon;
receiving a second input indicating a selection of one of the first and second selectable options; and
adjusting a size of the window in response to the second input, wherein adjusting the size of the window comprises changing a size of two or more edges of the window based on a direction associated with the selected selectable option.

2. The method of claim 1, wherein the first and second option icons are positioned immediately adjacent leftward and rightward of the control icon, respectively.

3. The method of claim 1, wherein the selected selectable option is associated with a left direction, and
wherein adjusting the size of the window further comprises adjusting a top edge and a bottom edge of the window to increase a size of the window in the left direction.

4. The method of claim 1, wherein the selected selectable option is associated with a right direction, and
wherein adjusting the size of the window further comprises adjusting a top edge and a bottom edge of the window to increase a size of the window in the right direction.

5. The method of claim 1, wherein the selected selectable option is associated with a left direction, and
wherein adjusting the size of the window further comprises adjusting a left edge and a bottom edge of the window to modify a size of the window based on an aspect ratio associated with the window.

6. The method of claim 1, wherein the first and second option icons comprise a left-arrow and a right-arrow, respectively.

7. The method of claim 1, wherein adjusting the size of the window further comprises:
moving an edge of the window to align the window with a grid; and
snapping the window to the grid.

8. The method of claim 7, wherein moving the edge of the window across a first predetermined location on the grid requires a level of input to overcome a resistance associated with the first predetermined location on the grid.

9. The method of claim 8, wherein moving the edge of the window across a second predetermined location on the grid requires an increased level of input to overcome a resistance associated with the second predetermined location on the grid.

10. A system for managing display of a window, the system comprising:
one or more processors;
a display coupled to the one or more processors; and
a computer-readable medium coupled to the one or more processors, wherein the computer-readable medium comprises instructions stored therein, which when executed by the one or more processors, cause the one or more processors to perform operations comprising:
presenting a window in a display area, wherein the window comprises a control icon;
receiving a first input, from a user, indicating a selection of the control icon;
presenting, in response to the first input, a plurality of selectable options associated with the control icon, wherein each of first and second selectable options correspond with one of a left direction and a right direction, wherein each of the first and second selectable options correspond with an option icon positioned immediately adjacent to the control icon;
receiving a second input, from the user, indicating a selection of one of the first and second selectable options; and
adjusting a size of the window in response to the second input, wherein adjusting the size of the window comprises changing a size of two or more edges of the window based on a direction associated with the selected selectable option.

11. The system of claim 10, wherein the first and second option icons are positioned immediately adjacent leftward and rightward of the control icon, respectively.

12. The system of claim 10, wherein the first selectable option is associated with the left direction, and
wherein adjusting the size of the window further comprises adjusting a top edge and a bottom edge of the window to increase a size of the window in the left direction.

13. The system of claim 10, wherein the second selectable option is associated with the right direction, and
wherein adjusting the size of the window further comprises adjusting a top edge and a bottom edge of the window to increase a size of the window in the right direction.

14. The system of claim 10, wherein the first selectable option is associated with the left direction, and
wherein adjusting the size of the window further comprises adjusting a left edge and a bottom edge of the window to modify a size of the window based on an aspect ratio associated with the window.

15. The system of claim 10, wherein the first and second option icons comprise a left-arrow and a right-arrow, respectively.

16. The system of claim 10, wherein adjusting the size of the window further comprises:
moving an edge of the window to align the window with a grid; and
snapping the window to the grid.

17. A non-transitory computer-readable medium comprising instructions stored therein, which when executed by one or more processors, cause the one or more processors to perform operations comprising:
presenting a window in a display area, wherein the window comprises a control icon;
receiving a first input, from a user, indicating a selection of the control icon;
presenting, in response to the first input, a plurality of selectable options associated with the control icon, wherein two of the plurality of selectable options correspond with one of a left direction and a right direction and further correspond with an option icon positioned immediately adjacent leftward and rightward of the control icon, respectively;

receiving a second input, from the user, indicating a selection of a first one of the two of the plurality of selectable options; and adjusting a size of the window in response to the second input, wherein adjusting the size of the window comprises changing a size of two or more edges of the window based on a direction associated with the first one of the plurality of selectable options.

18. The computer readable medium of claim 17, wherein the first one of the plurality of selectable options is associated with the left direction, and wherein adjusting the size of the window further comprises adjusting a top edge and a bottom edge of the window to increase a size of the window in the left direction.

19. The computer readable medium of claim 17, wherein the first one of the plurality of selectable options is associated with the right direction, and wherein adjusting the size of the window further comprises adjusting a top edge and a bottom edge of the window to increase a size of the window in the right direction.

20. The computer readable medium of claim 17, wherein the first one of the plurality of selectable options is associated with the left direction, and wherein adjusting the size of the window further comprises adjusting a left edge and a bottom edge of the window to modify a size of the window based on an aspect ratio associated with the window.

* * * * *